US010118160B2

(12) United States Patent
Winter et al.

(10) Patent No.: US 10,118,160 B2
(45) Date of Patent: Nov. 6, 2018

(54) PROCESS FOR PREPARING A HYDROTREATING CATALYST

(71) Applicant: SHELL OIL COMPANY, Houston, TX (US)

(72) Inventors: Ferry Winter, Amsterdam (NL); Jan Arend Van Welsenes, Amsterdam (NL); Marcello Stefano Rigutto, Amsterdam (NL); Patricia Johanna Anne Maria Giltay, Amsterdam (NL); Johannes Jacobus Maria Van Vlaanderen, Amsterdam (NL); Ali Azghay, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/033,927

(22) PCT Filed: Nov. 4, 2014

(86) PCT No.: PCT/EP2014/073639
§ 371 (c)(1),
(2) Date: May 3, 2016

(87) PCT Pub. No.: WO2015/067585
PCT Pub. Date: May 14, 2015

(65) Prior Publication Data
US 2016/0264879 A1  Sep. 15, 2016

(30) Foreign Application Priority Data

Nov. 7, 2013 (EP) ..................... 13191902

(51) Int. Cl.
| | |
|---|---|
| *B01J 27/19* | (2006.01) |
| *B01J 35/00* | (2006.01) |
| *B01J 35/02* | (2006.01) |
| *B01J 37/02* | (2006.01) |
| *B01J 37/08* | (2006.01) |
| *B01J 37/20* | (2006.01) |
| *B01J 23/883* | (2006.01) |
| *C10G 45/08* | (2006.01) |
| *B01J 21/04* | (2006.01) |
| *B01J 37/28* | (2006.01) |
| *B01J 31/02* | (2006.01) |
| *B01J 31/04* | (2006.01) |
| *B01J 35/10* | (2006.01) |
| *B01J 37/00* | (2006.01) |

(52) U.S. Cl.
CPC ............ *B01J 27/19* (2013.01); *B01J 21/04* (2013.01); *B01J 23/883* (2013.01); *B01J 35/0006* (2013.01); *B01J 35/026* (2013.01); *B01J 37/0201* (2013.01); *B01J 37/0203* (2013.01); *B01J 37/024* (2013.01); *B01J 37/0205* (2013.01); *B01J 37/0207* (2013.01); *B01J 37/0215* (2013.01); *B01J 37/0236* (2013.01); *B01J 37/08* (2013.01); *B01J 37/088* (2013.01); *B01J 37/20* (2013.01); *C10G 45/08* (2013.01); *B01J 31/0202* (2013.01); *B01J 31/04* (2013.01); *B01J 35/0026* (2013.01); *B01J 35/1019* (2013.01); *B01J 35/1061* (2013.01); *B01J 37/0018* (2013.01); *B01J 37/086* (2013.01); *B01J 37/28* (2013.01); *B01J 2523/00* (2013.01)

(58) Field of Classification Search
CPC . B01J 21/04; B01J 27/14; B01J 27/186; B01J 27/188; B01J 27/19; B01J 35/0006; B01J 35/026; B01J 37/0201; B01J 37/0236; B01J 37/08
See application file for complete search history.

(56) References Cited

U.S. PATENT DOCUMENTS

| | | | |
|---|---|---|---|
| 2005/0261124 A1 | 11/2005 | Yoshimura et al. | |
| 2006/0096891 A1* | 5/2006 | Stamires | ........... B01J 21/04 208/122 |
| 2009/0298677 A1 | 12/2009 | Radlowski et al. | |
| 2012/0145600 A1* | 6/2012 | Eijsbouts-Spickova | ................ B01J 21/04 208/215 |
| 2015/0209772 A1* | 7/2015 | Ouwehand | ........... B01J 21/12 208/111.3 |

FOREIGN PATENT DOCUMENTS

| | | |
|---|---|---|
| EP | 482818 | 12/1995 |
| JP | 2005262063 | 9/2005 |

(Continued)

OTHER PUBLICATIONS

Satterfield, C.N. (1980). Heterogeneous Catalysis in Practice, McGraw-Hill, 416 pgs (Office action cites p. 89).*
Database WPI Week 200570; Thomson Scientific,London, GB; An 2005-678976; XP002722866, & JP 2005 262063 A (Dokuritsu Gyosei Hojin Sangyo Gijutsu SO) Sep. 29, 2005.

*Primary Examiner* — Brian A McCaig
(74) *Attorney, Agent, or Firm* — Charles W. Stewart

(57) ABSTRACT

Process for preparing a hydrotreating catalyst comprising of from 5 wt % to 50 wt % of molybdenum, of from 0.5 wt % to 20 wt % of nickel and of from 0 to 5 wt % of phosphorus, all based on total dry weight of catalyst, which process comprises (a) treating alumina carrier with molybdenum and nickel and of from 1 to 60% wt of gluconic acid, based on weight of carrier, and optionally phosphorus, (b) optionally drying the treated carrier at a temperature of from 40 to 200° C., and (c) calcining the treated and optionally dried carrier at a temperature of from 200 to 650° C. to obtain the calcined treated carrier.

16 Claims, No Drawings

(56) References Cited

FOREIGN PATENT DOCUMENTS

| JP | 4061380 | 3/2008 | | |
|---|---|---|---|---|
| WO | 1996041848 | 12/1996 | | |
| WO | 2004018097 | 3/2004 | | |
| WO | 2009020913 | 2/2009 | | |
| WO | 2012021389 | 2/2012 | | |
| WO | 2013092806 | 6/2013 | | |
| WO | WO 2013/092806 A1 * | 6/2013 | .............. | B01J 21/12 |

* cited by examiner

PROCESS FOR PREPARING A HYDROTREATING CATALYST

PRIORITY CLAIM

The present application is the National Stage (§ 371) of International Application No. PCT/EP2014/073639, filed Nov. 4, 2014, which claims priority from European Patent Application No. 13191902.9, filed Nov. 7, 2013 incorporated herein by reference.

FIELD OF THE INVENTION

The present invention relates to a process for preparing hydrotreating catalyst.

BACKGROUND OF THE INVENTION

In the catalytic hydroprocessing of hydrocarbon feedstocks, such as crude oil, distillates and residual crude oil fractions, catalyst compositions containing hydrogenation metals are used to promote desulfurization and denitrogenation reactions and thereby provide for the removal of organic sulfur and organic nitrogen compounds from the hydrocarbon feedstocks. The processes involve contacting catalyst particles with a hydrocarbon feedstock under conditions of elevated temperature and pressure and in the presence of hydrogen to convert sulfur components of the feedstock to hydrogen sulfide and nitrogen components of the feedstock to ammonia. The hydrogen sulfide and ammonia subsequently are removed to give the hydrotreated product.

Hydrotreating catalysts comprise hydrogenation metal components on a refractory oxide. The hydrogenation metal components are generally Group VI metal components such as molybdenum and/or tungsten and Group VIII metal components such as nickel and/or cobalt. The porous refractory oxide support material can typically be alumina. Promoters such as phosphorus may also be used as a component of the hydroprocessing catalyst.

There is a continuous interest in further improving the performance of these catalysts.

A method which can lead to improved performance is treating a carrier with a solution containing catalytically active metal and an organic ligand and subsequently drying the treated carrier. By not calcining such dried catalyst, an improved performance can be attained as mentioned in publications such as EP-A-0482818, WO-A-96/41848, WO 2009/020913 and WO 2012/021389. The preparation of catalysts which are only dried but not calcined is relatively complex and cumbersome in actual commercial practice.

The aim of the present invention is to find a process which is relatively easy to apply while providing a hydrotreating catalyst having good activity in the manufacture of low sulphur and nitrogen fuels such as ultra low sulphur diesels.

SUMMARY OF THE INVENTION

It has now been found that this aim can be attained by treating a carrier with a metal containing impregnation solution further containing gluconic acid.

Accordingly, the present invention relates to a process for preparing hydrotreating catalyst comprising of from 5 wt % to 50 wt % of molybdenum, of from 0.5 wt % to 20 wt % of nickel and of from 0 to 5 wt % of phosphorus, all based on total dry weight of catalyst, which process comprises (a) treating alumina carrier with molybdenum, nickel and of from 1 to 60% wt of gluconic acid, based on weight of carrier, and optionally phosphorus,
(b) optionally drying the treated carrier at a temperature of from 40 to 200° C., and
(c) calcining the treated and optionally dried carrier at a temperature of from 200 to 650° C. to obtain the calcined treated carrier.

In accordance with the present process hydrotreating catalysts can be prepared with the help of a relatively simple process involving a limited number of process steps. Besides the easy manufacture, the invention has the advantage that the catalysts obtained were found to have a high activity in hydrodesulphurization.

DETAILED DESCRIPTION OF THE INVENTION

The catalyst of the present invention is prepared with the help of an alumina carrier. Preferably, the carrier consists of alumina. More preferably, the carrier consists of gamma alumina.

The porous catalyst carrier may have an average pore diameter in the range of from 5 to 35 nm, measured according to test ASTM D-4222. The total pore volume of the porous refractory oxide is preferably in the range of from 0.2 to 2 ml/gram.

The surface area of the porous refractory oxide, as measured by the B.E.T. method, generally exceeds 100 $m^2$/gram, and it is typically in the range of from 100 to 400 $m^2$/gram. The surface area is to be measured by the B.E.T. method according to ASTM test D3663-03.

The catalyst contains catalytically active metals on the carrier. These catalytically active metals are molybdenum in combination with nickel. It is preferred that additionally phosphorus is present. Therefore, the treated alumina carrier preferably consists of molybdenum, phosphorus, gluconic acid and nickel.

The metal component can be the metal per se or any component containing the metal, including but not limited to metal oxides, metal hydroxides, metal carbonates and metal salts.

For nickel, the metal component preferably is chosen from the group consisting of acetates, formates, citrates, oxides, hydroxides, carbonates, nitrates, sulfates, and two or more thereof. Preferably, the nickel component is a metal nitrate.

For molybdenum, preferred metals salts are molybdenum oxides and molybdenum sulphides. More preferred are salts additionally containing ammonium, such as ammonium heptamolybdate and ammonium dimolybdate.

The phosphorus compound that is used preferably is chosen from the group consisting of acids of phosphorus, such as metaphosphoric acid, pyrophosphoric acid, orthophosphoric acid and phosphorous acid, and precursors of an acid of phosphorus. The precursor is a phosphorus-containing compound capable of forming at least one acidic hydrogen atom in the presence of water. Preferred precursors are phosphorus oxide and phosphorus. The preferred acid of phosphorus is orthophosphoric acid (H3PO4).

The nickel can be present in the hydrotreating catalyst in an amount in the range of from 0.5 wt % to 20 wt %, preferably from 1 wt % to 15 wt %, and, most preferably, from 2 wt % to 12 wt %, based on metal on total dry weight of the hydrotreating catalyst.

The molybdenum can be present in the hydrotreating catalyst in an amount in the range of from 5 wt % to 50 wt %, preferably from 8 wt % to 40 wt %, and, most preferably, from 10 wt % to 30 wt %, based on metal on total dry weight of catalyst. Most preferably, the amount of molybdenum is at least 11% wt, more specifically at least 12% wt, more specifically at least 13% wt, most specifically at least 14% wt.

The phosphorus preferably is present in the hydrotreating catalyst in an amount in the range of from 0.1 to 5 wt %, preferably from 0.2 wt % to 5 wt %, and, more preferably, from 0.5 to 4.5 wt %, based on phosphorus on total dry weight of catalyst. Most preferably, the amount of phosphorus is of from 1.5 to 3.5% wt, based on total dry weight of catalyst.

The metals generally will be present in the form of an oxide or sulfide. For determining the metal content, it is assumed that they are present in the form of the metal per se independent of their actual form or state. The dry weight is the weight assuming that all volatile compounds such as water and gluconic acid have been removed. The dry weight can be determined by keeping the catalyst at a temperature of 400° C. for at least 2 hours. For the calculation of phosphorus content, phosphorus is assumed to be present as the element independent of its actual form.

The amount of gluconic acid preferably is of from 2 to 40% wt of gluconic acid, based on weight of dry carrier, more preferably of from 3 to 30% wt, more specifically of from 4 to 20% wt.

Preferably, the hydrotreating catalyst consists of from 0.5 wt % to 20 wt % of nickel, of from 5 wt % to 50 wt % of molybdenum and of from 0.1 to 5 wt % of phosphorus, all metal based on total dry weight of catalyst, on an alumina carrier, more preferably a carrier consisting of gamma alumina.

The catalytically active metals, gluconic acid and phosphorus preferably are incorporated in the carrier by treating the carrier with a solution containing these components. Most preferably, the components are added by pore volume impregnation with the help of a solution containing these components. It is preferred that all components are present in a single solution, most preferably an aqueous solution. It can be that not all components can be combined in a single impregnating solution for example because of stability problems. In such instance, it can be preferred to use two or more solutions with optionally a drying step in between.

The present invention involves treating the carrier with gluconic acid. This can be either gluconic acid or a salt of gluconic acid or an ester of gluconic acid which ester forms gluconate in the solution. If a solution is used for treating the carrier, the solution generally will contain a salt of gluconic acid possibly besides gluconic acid per se. For the present invention, treating the carrier with a salt of gluconic acid also is considered to be treating the carrier with gluconic acid. Preferably, the solution for treating the carrier is prepared by adding gluconic acid to the solvent.

Preferably, the ratio of weight amount of gluconic acid to the total weight amount of nickel and molybdenum deposited on the carrier is of from 0.1 to 5, more specifically of from 0.1 to 3, more specifically of from 0.2 to 3, more preferably of from 0.3 to 2.5, more preferably of from 0.5 to 2, more preferably of from 0.6 to 1.8, most preferably of from 0.7 to 1.5.

In step (b) the treated carrier can be dried before the calcination of step (c). Whether drying indeed should be carried out and if so, under what conditions, depends on the amount of volatile components present and on the subsequent calcination conditions. Generally, drying will be carried out during of from 0.1 to 6 hours at a temperature of from 40 to 200° C., more specifically during of from 0.5 to 4 hours at a temperature of from 100 to 200° C. Most preferably, drying is carried out by indirect heating which means that the environment surrounding the composition is heated. Indirect heating excludes the use of microwaves.

The calcination of step (c) preferably is carried out during of from 0.1 to 6 hours at a temperature of from 200 to 650° C., more specifically during of from 0.5 to 4 hours at a temperature of from 250 to 600° C., more specifically of from 280 to 550° C.

Without wishing to be bound to any theory, it is believed that the improved performance is due to the interaction between catalytically active metal, carrier and gluconic acid. It is believed that the interaction leads to smaller metal oxide particles upon calcination which smaller particle size is maintained during sulphidation.

The calcined treated carrier preferably is sulphided before being used in hydrotreating. Therefore, the process of the present invention preferably further comprises (d) sulphiding the calcined treated carrier to obtain the hydrotreating catalyst.

After sulphidation, which can be carried out in-situ or ex-situ, the catalyst is considered to be ready for commercial use.

The present invention also provides a process for hydrotreating a sulphur-containing hydrocarbon feedstock which process comprises contacting the hydrocarbon feedstock at a hydrogen partial pressure from 1 to 70 bar and a temperature of from 200 to 420° C. with a catalyst obtained in accordance with the present invention.

Sulphidation of the calcined treated carrier can be done using any conventional method known to those skilled in the art. Thus, the calcined treated carrier can be contacted with a gaseous stream containing hydrogen sulphide and hydrogen. In another embodiment, the calcined treated carrier is contacted with a sulphur-containing compound which is decomposable into hydrogen sulphide, under the contacting conditions of the invention. Examples of such decomposable compounds include mercaptans, $CS_2$, thiophenes, dimethyl sulfide (DMS), and dimethyl disulphide (DMDS). A further and preferred option is to accomplish sulphidation by contacting the composition, under suitable sulphurization treatment conditions with a hydrocarbon feedstock that contains a sulphur-containing compound. The sulphur-containing compound of the hydrocarbon feedstock can be an organic sulphur compound, particularly, one which is typically contained in petroleum distillates that are processed by hydrodesulphurization methods. Typically, the sulphiding temperature is in the range of from 150 to 450° C., preferably, from 175 to 425° C., and, most preferably, from 200 to 400° C.

The sulphiding pressure can be in the range of from 1 bar to 70 bar, preferably, from 1.5 bar to 55 bar, and, most preferably, from 2 bar to 45 bar.

The present invention is explained in more detail in the following examples.

EXAMPLES

Example 1

Nickel/molybdenum Containing Catalyst

Commercial carrier was prepared by extruding pseudo-boehmite into 1.3 mm trilobes and drying and calcining these to provide alumina carrier as described in Table 1.

The average pore diameter was measured according to ASTM test D-4222. The surface area was measured according to ASTM test D-366303.

TABLE 1

Alumina carrier properties

| Property | Carrier |
|---|---|
| Calcination temperature (° C.) | 535 |
| BET Surface Area ($m^2/g$) | 300 |
| Average Pore Diameter (nm) | 9 |

The metal components of the catalyst were incorporated into the above carrier by pore volume impregnation to yield the following metals composition (weight of metal based on dry weight of total catalyst): 15% Mo, 3.5% Ni, 2.2% P. The impregnation solution included phosphoric acid, nickel oxide, molybdenum trioxide and gluconic acid. The total volume of the resulting solution was equal to 98% of the water pore volume of the alumina carrier. The gluconic acid concentration in the impregnation solution was 20% wt corresponding with a gluconic acid content of 12.5% wt based on carrier.

The impregnated carrier was then dried at 110° C. for 2 hours and subsequently calcined for 2 hours at 400° C. to remove gluconic acid.

The following catalyst was obtained.

TABLE 2

Ni/Mo catalyst

| Catalyst | Amount of gluconic acid (% wt on carrier) | Calcination temperature | Compacted bulk density (g/ml) |
|---|---|---|---|
| 1 | 12.5 | 400 | 0.72 |

Example 2

Catalyst Activities

Trickle flow micro-reactors were used to test the desulfurization activity of the catalyst according to the invention compared with a commercial reference catalyst.

The compositions were conditioned and sulphided by contacting them with a liquid hydrocarbon containing sulfur spiking agent to provide a sulfur content of 2.5% wt. The process conditions used in these tests comprise a gas to oil ratio of 300 Nl/kg, a pressure of 40 bar and a liquid hourly space velocity of 1 $h^{-1}$. The weight average bed temperature (WABT) was adjusted to a temperature in the range of 340 to 380° C.

The feed used in the tests is a full range gas oil containing 1.28% wt of sulphur.

The process conditions and feed properties are representative of typical ultra-low sulfur diesel (ULSD) operations.

Rate constants were determined assuming a reaction order of 1.25. The temperature required to obtain a product containing 10 ppm of sulphur is given in Table 3. The lower temperature required to achieve this sulphur content and the higher RVA show that the catalysts according to the present invention have improved performance.

The relative volumetric activity (RVA) for catalyst 1 was determined relative to comparative commercial catalyst containing similar amounts of nickel, molybdenum and phosphorus and having a compact bulk density of 0.74 ml/g, hereinafter referred to as Comparative Catalyst.

Table 4 shows the temperature required to obtain a product containing 10 ppm of sulphur. The lower temperature required to achieve this sulphur content and the higher RVA show that the catalyst according to the present invention has improved performance over the Comparative Catalyst.

TABLE 4

Hydrodesulphurization activity

| | Temperature required for 10 ppm S (° C.) | RVA (%) |
|---|---|---|
| Comparative Catalyst | 368.5 | 100 |
| 1 | 363.9 | 115 |

That which is claimed is:

1. A process for preparing a hydrotreating catalyst, wherein the hydrotreating catalyst comprises from 5 wt % to 50 wt % molybdenum, from 0.5 wt % to 20 wt % nickel, and from 0 to 5 wt % phosphorus, all based on total dry weight of catalyst, which process comprises:
   impregnating an alumina carrier with an impregnation solution, consisting essentially of a phosphorus compound, a molybdenum component, a nickel component, and gluconic acid that is present in the impregnation solution in such an amount to provide a ratio of weight of gluconic acid to the total weight of nickel and molybdenum of from 0.1 to 5, and a phosphorus compound, to thereby provide an impregnated carrier;
   drying the impregnated carrier at a temperature of from 40 to 200° C. followed by calcining the impregnated carrier at a temperature of from 200 to 650° C. to obtain a calcined impregnated carrier; and
   sulphiding the calcined impregnated carrier to obtain the hydrotreating catalyst.

2. A process according to claim 1, wherein the amount of gluconic acid in the hydrotreating catalyst is of from 2 to 40% wt, based on total dry weight of the alumina carrier.

3. A process according to claim 2, wherein the amount of phosphorus in the hydrotreating catalyst is of from 1.5 to 3.5% wt, based on total dry weight of hydrotreating catalyst.

4. A process according to claim 1, wherein the hydrotreating catalyst comprising from 1 wt % to 15 wt % nickel, of from 8 wt % to 40 wt % molybdenum and of from 0.1 to 5 wt % phosphorus, all metal based on total dry weight of hydrotreating catalyst.

5. A process according to claim 4, in which the alumina of the alumina carrier is gamma alumina.

6. A process for hydrotreating a sulphur-containing hydrocarbon feedstock, which process comprises: contacting the hydrocarbon feedstock at a hydrogen partial pressure from 1 to 70 bar and a temperature of from 200 to 420° C. with a catalyst obtained according to claim 4.

7. A process for hydrotreating a sulphur-containing hydrocarbon feedstock, which process comprises: contacting the hydrocarbon feedstock at a hydrogen partial pressure from 1 to 70 bar and a temperature of from 200 to 420° C. with a catalyst obtained according to claim 1.

8. A process according to claim 1, wherein the gluconic acid concentration of the impregnation solution is such to provide the ratio of gluconic acid to total weight of nickel and molybdenum is of from 0.3 to 2.5.

9. A process according to claim 1, wherein the gluconic acid concentration of the impregnation solution is such to provide the ratio of gluconic acid to total weight of nickel and molybdenum is of from 0.5 to 2.

10. A process according to claim 9, wherein the amount of gluconic acid in the impregnated carrier is of from 3 to 30% wt, based on the total dry weight of the alumina carrier.

11. A process according to claim 10, wherein the hydrotreating catalyst comprising from 2 wt % to 12 wt % nickel, of from 10 wt % to 30 wt % molybdenum and of from 0.2 to 5 wt % phosphorus, all metal based on total dry weight of hydrotreating catalyst.

12. A process for hydrotreating a sulphur-containing hydrocarbon feedstock, which process comprises: contacting the hydrocarbon feedstock at a hydrogen partial pressure from 1 to 70 bar and a temperature of from 200 to 420° C. with a catalyst obtained according to claim 11.

13. A process according to claim 1, wherein the gluconic acid concentration of the impregnation solution is such to provide the ratio of gluconic acid to total weight of nickel and molybdenum is of from 0.7 to 1.5.

14. A process according to claim 13, wherein the amount of gluconic acid in the impregnated carrier is of from 4 to 20% wt, based on the total dry weight of the alumina carrier.

15. A process according to claim 14, wherein the hydrotreating catalyst comprising from 2 wt % to 12 wt % nickel, of from at least 11 wt % to 30 wt % molybdenum and of from 0.5 to 4.5 wt % phosphorus, all metal based on total dry weight of hydrotreating catalyst.

16. A process for hydrotreating a sulphur-containing hydrocarbon feedstock, which process comprises: contacting the hydrocarbon feedstock at a hydrogen partial pressure from 1 to 70 bar and a temperature of from 200 to 420° C. with a catalyst obtained according to claim 15.

* * * * *